United States Patent [19]
Hashimoto et al.

[11] Patent Number: 5,608,299
[45] Date of Patent: Mar. 4, 1997

[54] ROBOT APPARATUS

[75] Inventors: Yoshiki Hashimoto, Hadano; Yasuyuki Shimoda, Yamanashi; Tatsuya Obi, Yamanashi; Yasuhiro Matsuo, Yamanashi; Tomoki Ohya, Yamanashi, all of Japan

[73] Assignee: Fanuc Ltd., Japan

[21] Appl. No.: 436,459

[22] PCT Filed: Oct. 6, 1994

[86] PCT No.: PCT/JP94/01677

§ 371 Date: May 25, 1995

§ 102(e) Date: May 25, 1995

[87] PCT Pub. No.: WO95/11114

PCT Pub. Date: Apr. 27, 1994

[30] Foreign Application Priority Data

Oct. 18, 1993 [JP] Japan .................................. 5-259635

[51] Int. Cl.⁶ ...................................................... B25J 19/00
[52] U.S. Cl. .......................................... 318/568.11; 901/50
[58] Field of Search ........................... 318/568.11, 568.2, 318/568.21; 901/2, 14, 19, 49, 50

[56] References Cited

U.S. PATENT DOCUMENTS 4,379,335  4/1983  Kirsch et al. ............................. 364/513
5,083,284  1/1992  Kato .
5,205,701  4/1993  Kigami et al. .

FOREIGN PATENT DOCUMENTS 0536417     4/1993   European Pat. Off. .
61-284386  12/1986   Japan .
2-298488   12/1990   Japan .
4-105886    4/1992   Japan .

*Primary Examiner*—Bentsu Ro
*Attorney, Agent, or Firm*—Staas & Halsey

[57] ABSTRACT

In a robot apparatus comprising a robot mechanical unit and a robot controller, the robot apparatus does not need a connecting cable for connecting the robot mechanical unit to the robot controller. The robot mechanical unit includes a connector for receiving a control signal and outputting a sensor signal, in addition to an arm and a drive unit. The robot controller includes a circuit for controlling the robot mechanical unit, a servo amplifier, and a connector capable of being directly coupled with the connector of the robot mechanical unit. Further, the robot controller is installed at a location adjacent to the robot mechanical unit and within a dead space of an operating area of the robot mechanical unit.

4 Claims, 3 Drawing Sheets

ROBOT APPARATUS

BACKGROUND OF THE INVENTION

1. Field of the Invention

The present invention relates to a robot apparatus, and more specifically, to a robot apparatus which does not need a connecting cable for connecting a robot mechanical unit to a robot controller.

2. Description of the Related Art

Conventionally, a robot mechanical unit is controlled by a robot controller by such an arrangement that the robot mechanical unit is electrically connected to the robot controller disposed externally of the operating area of the robot mechanical unit, for example, on the outside of a safety fence through a connecting cable so that an operation command from the robot control unit is applied to the robot mechanical unit through the connecting cable. For the protection of the connecting cable, the cable is wired through equipment such as a cable duct or a pit defined in a floor on which a robot is installed. The opposite ends of the cable are terminated by connectors which are connected to the connectors of the robot controller and the robot mechanical unit, respectively.

Further, the robot controller is usually installed along a predetermined path for operators formed on the floor on which the robot mechanical unit is installed outside the safety fence disposed to surround the robot mechanical unit. When such a space for installation is not available, a bridge may be installed above the robot mechanical unit to install the robot controller thereon. In any case, the robot mechanical unit is connected through the connecting cable to the robot controller disposed far from it, and equipment is provided to protect the connecting cable.

Since the conventional robot controller is installed at a location far from the robot mechanical unit, the connecting cable is indispensable to the robot controller and a space for installing the connecting cable and equipment for protecting the cable are needed. Further, since the robot controller must be installed externally of the operating area of a robot, a space where the robot controller is installed must be provided.

Further, when facilities of a factory are changed by transferring the robot controller and the like, the robot controller must be disconnected from the robot mechanical unit, which is carried out by removing the connecting cable from the connectors. When the connecting cable is simply removed from the connectors, the connecting cable is left as it is. Since the connecting cable has a large weight per unit length and when there is a distance of e.g. 20 meters between the robot controller and the robot mechanical unit, the weight is as heavy as several tens of kilograms. Thus, when the cable is removed once and reinstalled, the handling of the connecting cable is not easy. Moreover, since equipment for protecting the connecting cable is additionally needed, even if the robot controller or robot mechanical unit is transferred, for example, by 1 meter, it requires a heavy job. Further, when several tens of robots are installed on a manufacturing line of a factory, a job for transferring them is furthermore difficult.

SUMMARY OF THE INVENTION

Taking the above into consideration, an object of the present invention is to provide a robot apparatus which does not need a connecting cable for connecting a robot mechanical unit to a robot controller.

To achieve the above object, in accordance with the present invention, there is provided a robot apparatus for controlling the operation of a robot mechanical unit by a robot controller electrically connected to the robot mechanical unit, which comprises the robot mechanical unit including an arm, a drive unit, a connector for receiving a control signal and the like and outputting a sensor signal and the robot controller including a circuit for controlling the robot mechanical unit, a servo amplifier, a connector directly coupled with the connector of the robot mechanical unit, and the like, the robot controller being installed at a location adjacent to the robot mechanical unit within the dead space of the operating area of the robot mechanical unit.

There is certainly a location rearwardly of the robot mechanical unit and outside of the operating area of the robot mechanical unit which is in a dead space and cannot be used by a robot system. The robot controller is installed in the location. The robot controller is directly connected to the robot mechanical unit through the connectors provided for both of them.

DETAILED DESCRIPTION OF THE PREFERRED EMBODIMENTS

An embodiment of the present invention will be described below with reference to the attached drawings.

Figure 1:
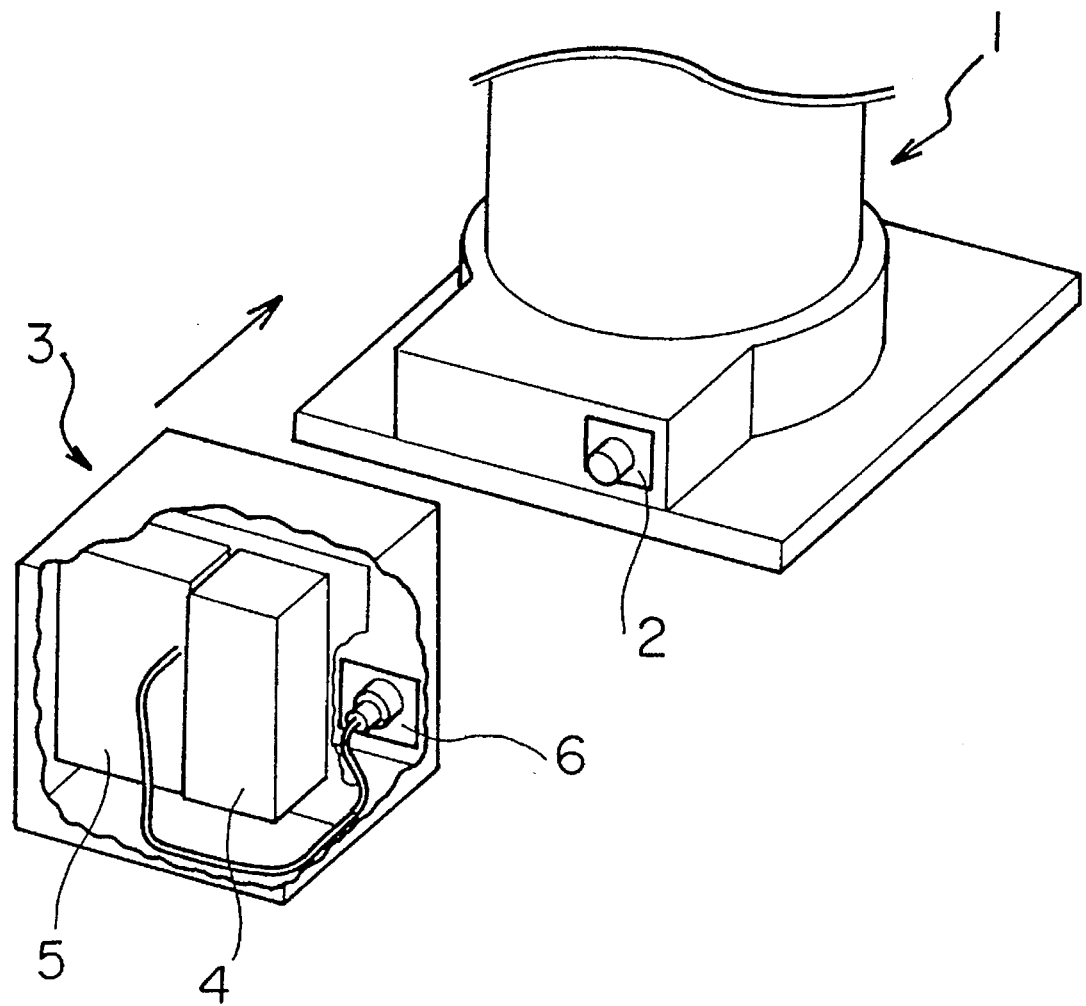
FIG. 1 is a perspective view showing an arrangement of a robot apparatus according to the present invention.

FIG. 1 is a perspective view showing an arrangement of a robot apparatus according to the present invention. In FIG. 1, numeral 1 denotes a robot mechanical unit having an arm, a driving unit for driving the arm and various sensors although they are not shown. A connector 2 is fixed on the bottom of the robot mechanical unit 1 to receive a control signal and the like and output a sensor signal. Numeral 3 denotes a robot controller including a control circuit 4 and a servo amplifier 5 therein. A connector 6 is disposed on a side of the robot controller 3. The connector 6 is fixed in confrontation with the connector 2 of the robot mechanical unit 1 and directly coupled with the connector 2 of the robot mechanical unit 1.

In the robot controller 3, a control signal sent from the control circuit 4 is amplified by the servo amplifier 5 and then supplied to the robot mechanical unit 1 through the connectors 6 and 2. The robot mechanical unit 1 controls the drive unit in response to the control signal.

To facilitate the mechanical coupling of the connector 2 of the robot mechanical unit 1 with the connector 6 of the robot controller 3, it is preferable to provide guide means such as a base on which the robot mechanical unit 1 and the robot controller 3 are mounted, a slide rail on which the robot controller 3 is slidingly mounted or the like.

Figure 2:
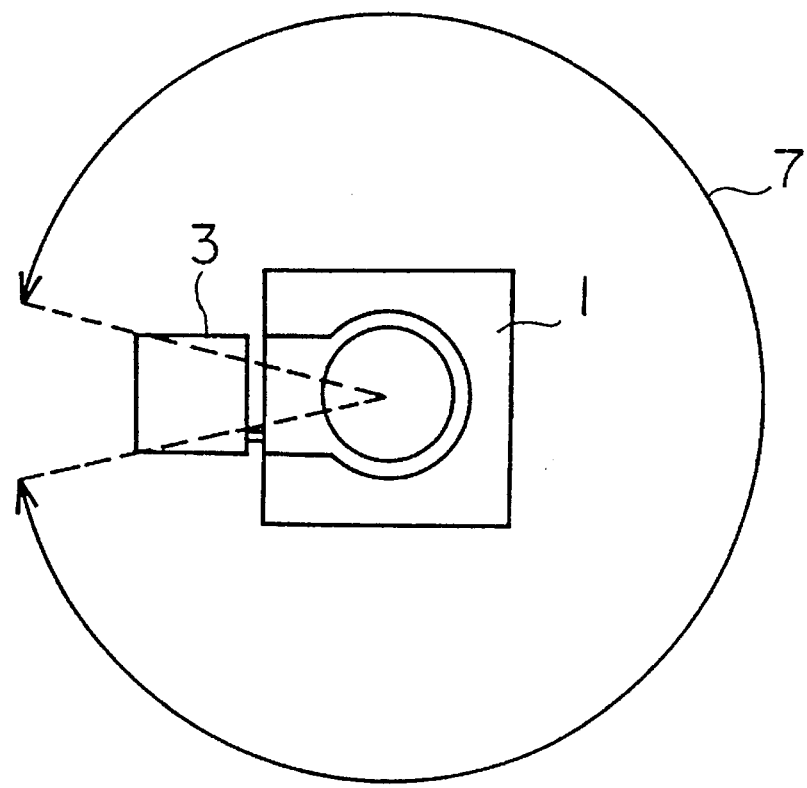
FIG. 2(A) and FIG. 2(B) are views explaining a location where a robot controller is installed.
Figure 2:
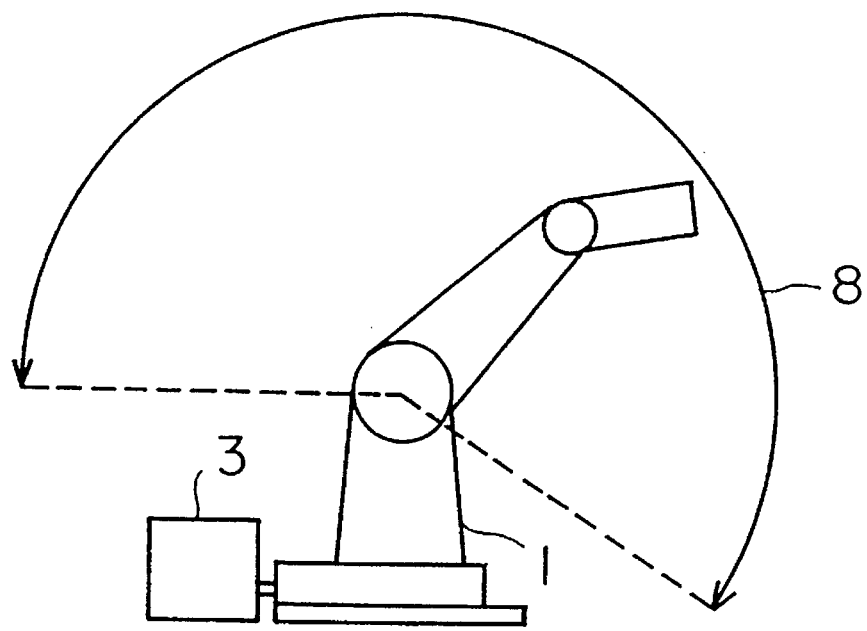

FIG. 2(A) and FIG. 2(B) are views explaining a location where a robot controller is installed, wherein FIG. 2(A) is a plan view showing the robot apparatus observed from above and FIG. 2(B) is a side elevational view showing the robot apparatus observed from the side. The robot mechanical unit 1 has a lateral operating area 7 shown by an arrow and a longitudinal operating area 8. The distal end of an arm or hand rotates within the operating areas 7 and 8. The robot controller 3 is installed at a location as near as possible to the robot mechanical unit 1 externally of the operating areas 7 and 8 of the robot mechanical unit 1. The installing location is a location where operators are essentially prohibited from entering there and positioned within a safety fence disposed around the robot mechanical unit 1. Consequently, it can be said that the location where the robot controller 3 is to be installed is a location external of the operating areas 7 and 8 of the robot mechanical unit 1 forming a dead angle which cannot be used by a robot system.

Figure 3:
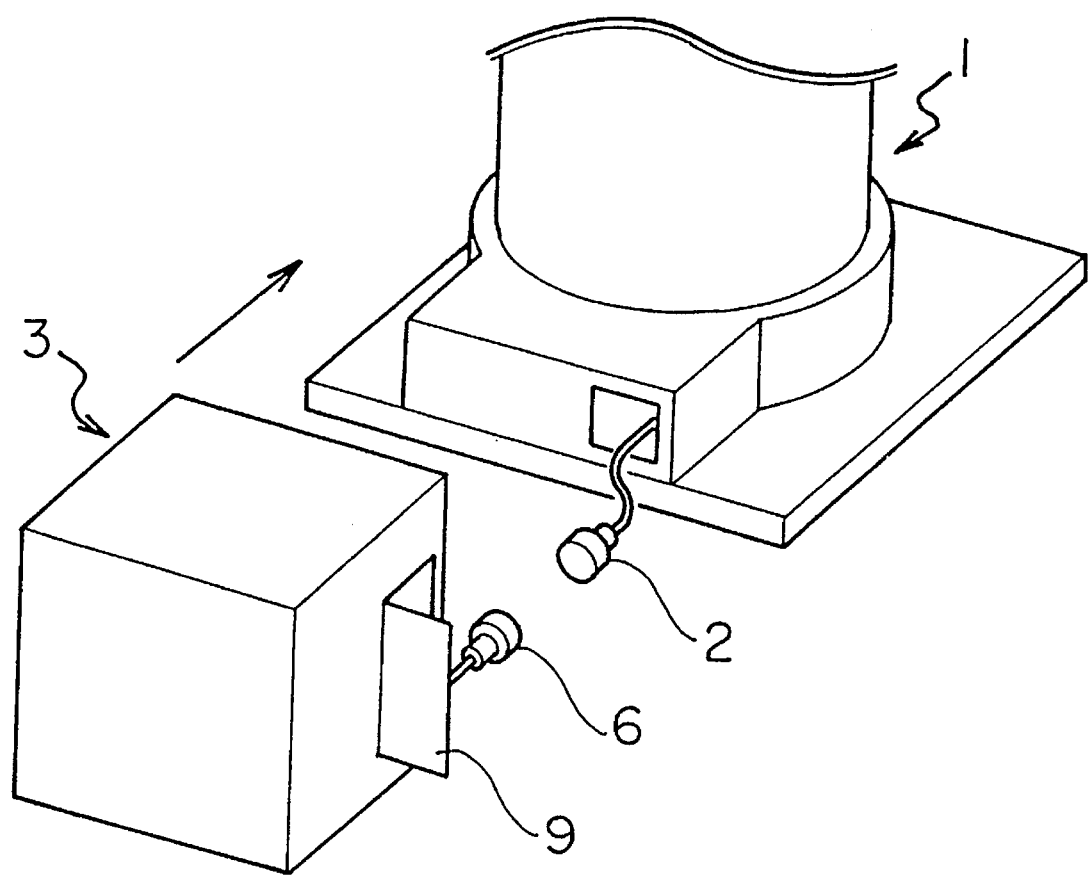
FIG. 3 is a perspective view showing another embodiment of the robot apparatus according to the present invention.

FIG. 3 is a perspective view showing another embodiment of the robot apparatus according to the present invention. The same numerals as used in FIG. 1 are used to denote the same parts in FIG. 3. According to the embodiment, the connector 2 of the robot mechanical unit 1 is disposed to the robot mechanical unit 1 without being fixed thereto. More specifically, the connector 2 only terminates an internal wiring cable and is mechanically made free. On the other hand, the connector 6 of the robot controller 3 is also disposed to the robot controller 3 without being fixed thereto likewise, so that when a door 9 is opened, the connector 6 can be taken out to the outside together with the internal wiring cable.

The robot mechanical unit 1 is connected to the robot controller 3 by coupling the connector 2 with the connector 6 each having a mechanically free distal end. According to this arrangement, even if a floor surface on which the robot mechanical unit 1 and the robot controller 3 are installed is rough and not flat such as a floor of a factory, it can be prevented that the load of the robot controller 3 is concentrated on the connectors 2 and 6 due to mechanical coupling of the robot mechanical unit 1 with the robot controller 3 via the connectors 2 and 6, or due to vibration of the operation of the robot mechanical unit 1. Thus, a mechanical damage in the connectors 2 and 6 can be avoided.

Although the concentration of stress to the connectors 2 and 6 is reduced by making the connectors 2 and 6 free without being fixed in the embodiment of FIG. 3, it is needless to say that the same effect can be obtained even if any one of the connector 2 of the robot mechanical unit 1 and the connector 6 of the robot controller 3 is fixed as another embodiment.

As described above, according to the present invention, since the robot controller is installed at a location which cannot be essentially used in a factory, i.e., a location which is in the dead space of the operating area of the robot mechanical unit and is positioned adjacent to the robot mechanical unit, a dedicated space for the installation of the robot controller is not needed, whereby a limited site and space such as a factory can be effectively used.

Since the connecting cable which might otherwise have been disposed by threading its way through a narrow space is not needed, a job for installing the connecting cable and equipment such as a duct for the connecting cable becomes unnecessary, whereby the arrangement for a robot apparatus is simplified with a result that the robot apparatus can be installed at a low cost.

Since the robot mechanical unit can be easily separated from the robot controller by disconnecting their connectors, when the robot controller is replaced with another robot controller having an interchangeable hardware, the latter robot controller can be connected to the robot mechanical unit only by recoupling its connector to the connector of the robot mechanical unit because a connecting cable need not be taken into consideration. Thus, not only disconnection of the robot controller can be simplified but also maintenance can be easily carried out due to its detachability.

We claim:

1. A robot apparatus for controlling an operation of a robot mechanical unit by a robot controller electrically connected to the robot mechanical unit, comprising:

a robot mechanical unit including an arm, a drive unit, and a first connector for receiving a control signal and outputting a sensor signal; and a robot controller including a circuit for controlling said robot mechanical unit, a servo amplifier, and a second connector directly coupled with the first connector of said robot mechanical unit, said robot controller being installed at a location adjacent to said robot mechanical unit and within a dead space of an operating area of said robot mechanical unit, said dead space not being accessible by said robot mechanical unit.

2. A robot apparatus according to claim 1, wherein said second connector provided for said robot controller is disposed to said robot controller by being fixed thereto, said first connector provided for said robot mechanical unit is disposed to said robot mechanical unit by being fixed thereto in confrontation with the second connector of said robot controller and directly and detachably coupled with the second connector of said robot controller.

3. A robot controller according to claim 1, wherein said second connector provided for said robot controller is disposed to said robot controller without being fixed thereto and said first connector provided for said robot mechanical unit is disposed to said robot mechanical unit without being fixed thereto and directly and detachably coupled with the second connector of said robot controller.

4. A robot controller according to claim 1, wherein said second connector provided for said robot controller is disposed to said robot controller by being fixed thereto or without being fixed thereto and said first connector provided for said robot mechanical unit is disposed to said robot mechanical unit by being fixed thereto or without being fixed thereto and directly and detachably coupled with the second connector of said robot controller.

* * * * *